Nov. 28, 1944.　　　E. N. GOODMAN　　　2,363,958
DEMAND METER AND CONTROL THEREFOR
Filed Sept. 9, 1943　　　2 Sheets-Sheet 1

INVENTOR.
Emanuel N. Goodman
BY
Attorney

Nov. 28, 1944.   E. N. GOODMAN   2,363,958
DEMAND METER AND CONTROL THEREFOR
Filed Sept. 9, 1943   2 Sheets-Sheet 2
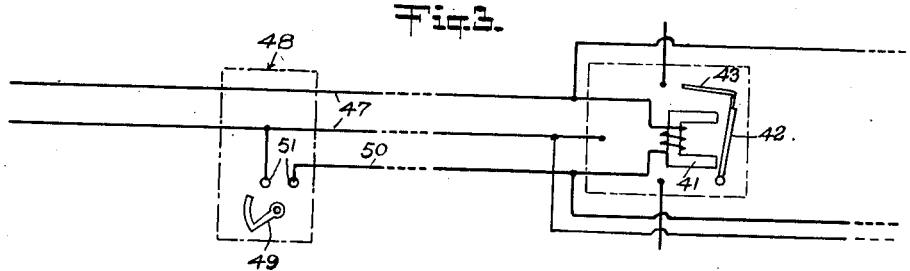
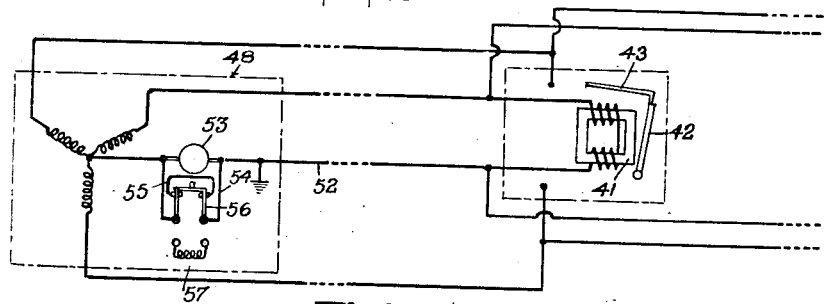
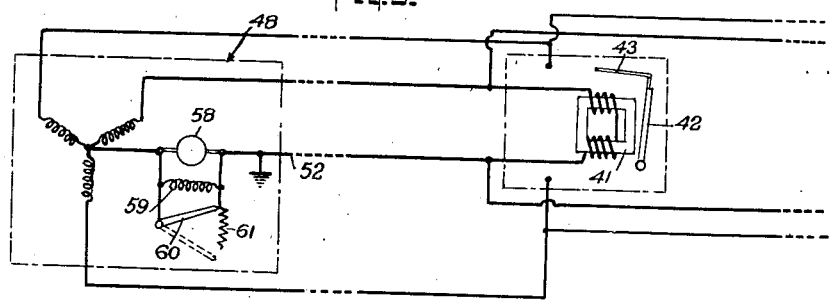
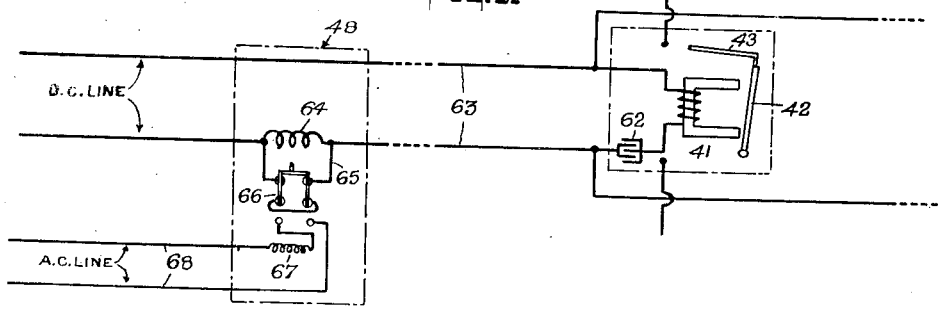
INVENTOR.
Emanuel N. Goodman
BY
Attorney Patented Nov. 28, 1944

2,363,958

UNITED STATES PATENT OFFICE 2,363,958

DEMAND METER AND CONTROL THEREFOR

Emanuel N. Goodman, New York, N. Y.

Application September 9, 1943, Serial No. 501,639

2 Claims. (Cl. 171—34)

This invention relates to improvements in measuring instruments and has particular reference to a demand meter and control system therefor.

In demand meters for measuring electrical current consumption, as heretofore used, it has been customary to advance the indicator by which the maximum average demand is obtained, by means of an operating element known as a "pusher" and then, at regular intervals of time, to return said operating element to a normal position from which it again advances during the next succeeding interval of time. In some known meters of this kind, a synchronous motor individual to each meter has been employed to return the pusher to normal. Aside from the fact that the manufacture and installation of such a motor in each individual meter of a system is a considerable added expense, these motors, although they each operate at regular intervals to restore the associated pusher to normal, do not operate simultaneously to perform this function.

In accordance with the present invention, it is proposed to eliminate the use of individual synchronous motors for each measuring instrument, with an attendant material reduction in the cost of manufacture, and to simultaneously and periodically control, from a central station, the restoration of the pushers of all meters in a system by the transmission of an impulse over a common line to energize an electromagnetic device at each meter which is operatively connected to the pusher of such meter.

Another feature is to provide an improved measuring instrument in which a simple and practical operating means for a demand indicator is controlled by the energization of an electromagnetic device to periodically restore said operating means to a normal position without affecting the advanced position of said indicator.

The inventive idea involved is capable of receiving a variety of expressions some of which, for purposes of illustration, are shown in the accompanying drawings wherein—

Fig. 3 is a diagrammatic view of a circuit employed for operating a series of measuring instruments from a central control station, and Figs. 4, 5, and 6 are similar views illustrating other forms of circuits which may be employed.

Figure 1:
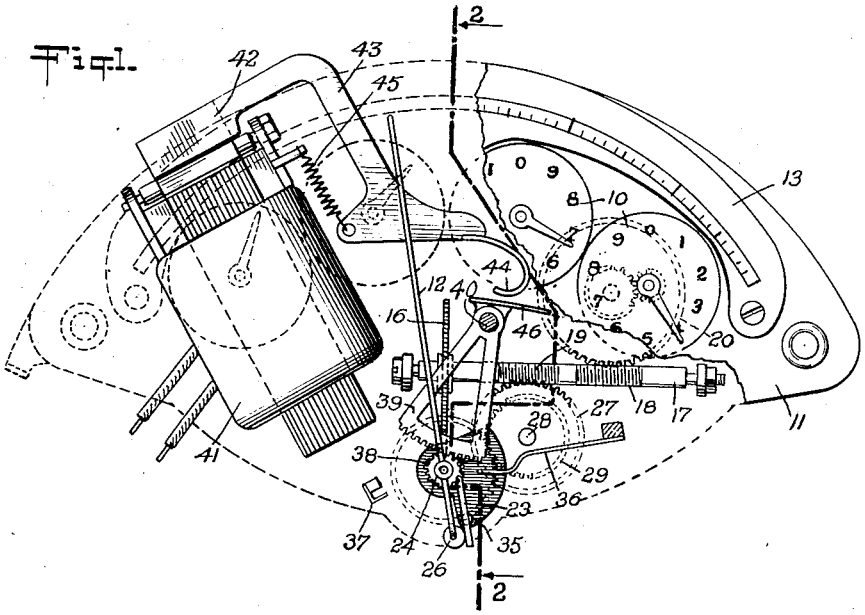
Fig. 1 is a front elevation of a demand meter, broken away to show the mechanism in the rear of the face plate and illustrating only so much of the entire mechanism of the meter as is necessary for an understanding of the present invention.
Figure 2:
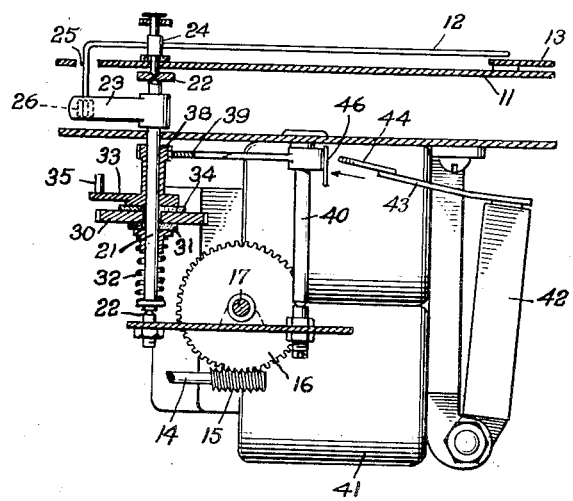
Fig. 2 is a sectional view taken substantially on the line 2—2 of Fig. 1.

It will be understood that the invention is adapted for use with various types of measuring instruments and that the watthour demand meter shown in Figs. 1 and 2 is employed merely to illustrate an adaptation in which an integrating mechanism including a plurality of registering dials 10 are mounted upon the face plate 11, and wherein the indicator 12 is movable rotatively over the graduated dial 13 fixed to said face plate above said dials 10. Said integrating mechanism is operated from the usual shaft 14 of the meter which has a worm 15 thereon for driving the gear 16. This latter gear is mounted on the shaft 17 having the worms 18 and 19, the former of which engages the gear 20 of the usual train of gearing (not shown) employed to operate the elements of the integrating mechanism. This type of meter has a shaft 21 rotatably mounted between bearings 22 and carries, at its end adjacent the face plate 11, the indicator operating element or pusher 23 in the form of an arm. The indicator 12 is rotatably mounted at 24 in alinement with the axis of the shaft 21, and its inner bent end projects through an opening 25 in the face plate 11 and carries a small roller 26 adapted to be contacted by the pusher 23 as the latter is rotated in a clockwise direction (Fig. 1) to advance the indicator 12 over the graduated dial 13. As is customary, this advance of the indicator is accomplished during a predetermined interval of time and at the end of such interval the pusher 23 is returned to normal, leaving the indicator in its advanced position so as to register the maximum demand for said interval. During the next succeeding interval of time, the pusher may or may not reach the roller 26 and in the former event the indicator is advanced again, and at the termination of a period of time, such as thirty days, the then advanced position of the indicator will register the maximum average demand on the meter for said period.

The shaft 21 is driven from the worm 19 on the shaft 17 through the medium of a gear 27 meshing with said worm and mounted on a shaft 28 which also carries another gear 29 meshed with the gear 30 loosely mounted on the shaft 21. Said gear 30 is supported on the shaft by a collar 31 engaged by the coil spring 32 on said shaft so as to exert a yielding pressure upon said gear. Fixed on the shaft 21 is a plate 33 and interposed between the latter and the gear 30 is a friction disc 34 which constitutes a clutch between said gear and plate to rotate the latter and consequently the shaft 21 to advance the pusher 23 from its normal position to the other extremity of its movement. In the normal position of the pusher, a pin 35 on the plate 33 contacts a light spring stop 36 mounted on the framework of the meter, and this stop pin limits the movement of the pusher from an advanced to the normal position thereof, as will appear in the course of the description. At the extremity of its advanced movement, if such point is reached during the operation of the meter, the pusher forces the roller 26 on the indicator against the stop pin 37 and, in this event, further rotation of the gear 30, due to continuing operation of the shaft 17, will be independent of the shaft 21 because of the friction clutch arrangement including the disc 34. Also due to this clutch arrangement, when the pusher is restored to normal, as will presently appear, the counter-clockwise rotation of the shaft 21 during the instant of restoration is independent of the gear 30 which may continue to be rotated by the gear 29. With the latter gear being driven at the instant the pusher is returned to normal, said pusher will immediately start its advancing movement since the gear 30 will have then again become effective to drive the plate 33 through the clutch disc 34.

For the purpose of effecting the return movement of the pusher 23 to normal position, it is proposed to fix on the shaft 21 a small gear 38 with which is meshed a large segmental gear 39 mounted upon the shaft 40. As the shaft 21 is rotated clockwise, the gear 38 turns the gear 39 in the opposite direction about the shaft without effect, but when the movement of the latter gear is reversed by the energization of a suitable electromagnetic device 41, the gear 38 and plate 33, and consequently the shaft 21, will be rotated counter-clockwise and independently of the gear 30 until the pin 35 on the plate contacts the spring stop 36, whereupon the pusher will again be in normal position and ready for its next advancement toward the indicator 12 which had remained in the position to which it had been advanced by the previous operation of the pusher.

The electromagnetic device 41 is energized, in accordance with the invention, at regular intervals by an impulse transmitted thereto from a central control station and when so energized its armature 42 is attracted. Said armature is provided with an extension 43 that terminates in a spring contact piece 44 so positioned that when the armature is attracted against the tension of its return spring 45, the contact 44 will engage the shoe 46 carried by the gear 39 adjacent its shaft 40 and, as a consequence, said gear will be turned to rotate the shaft 21, through the gear 38, in a counter-clockwise direction to restore the pusher 23 to its normal position, whereupon the device 41 becomes deenergized and its armature, and the parts 43 and 44 carried thereby, are also returned to normal by the spring 45.

When a number of meters such as described are included in a system it is desirable, for reasons of practicability, that the electromagnets thereof be simultaneously energized at predetermined intervals and, for this purpose, the invention further contemplates a circuit in which all the meters in the system are controlled from a central station by the transmission therefrom of an impulse which will energize the electromagnets 41 of all the meters to restore the associated pushers to normal at one and the same time. As shown in Fig. 3, all the meters are connected to the line conductors 47 leading from the central control station 48 at which is located a time controlled switch conventionally shown and indicated by the numeral 49. In this circuit, which may be supplied with either alternating or direct current, an auxiliary conductor 50 is employed that is connected to the winding of each electromagnet 41 and in which the normally open contacts 51 of the switch 49 are included. Thus, when the said switch, which may be operated by a synchronous motor or other suitable means, closes the contacts 51 momentarily, an impulse is transmitted over the auxiliary conductor 50 which will energize all the electro-magnets 41 in the system simultaneously and thus effect the restoration of the pushers 23 to their normal positions.

In Fig. 4, the adaptation of the central control to a 3-phase, 4-wire system is shown. In this embodiment, the various electromagnets in the system are so designed that the normal voltage of an alternating current installation will not energize the magnets against their spring tension, but when a low voltage direct current is impressed upon the circuit of said magnets they will energize to restore their respective pushers. The electromagnets in this circuit may also be designed with a magnetic leakage shunt so that the pull of the magnets becomes ample to energize the magnets and thus restore the pushers. Therefore, at the control station a low voltage, self-excited direct current generator is connected to the neutral, grounded conductor 52 of the 4-wire system, with the armature 53 of said generator normally short circuited by the shunt 54 and the jumper 55 the latter of which is engaged by the time controlled switch generally indicated by the numeral 56 and operated in a manner similar to the switch 49. When said switch is operated at predetermined and regular intervals, it is thrown to the position where it engages the terminals of the generator shunt field 57, thus momentarily connecting said field to the line circuit to energize all the electromagnets therein, after which said switch is returned to its normal position. While, according to the illustration, the armature 53 remains in the circuit at all times, it is not necessary to keep the generator running continuously, since it is quite possible to control the same so that it may be started just prior to the time when the switch 56 is due to be operated.

In the arrangement illustrated in Fig. 5, a shunt wound generator at the control station is conventionally shown in which the armature 58 is in circuit with the grounded, neutral conductor 52, and the generator, together with its shunt field 59, is normally shorted by the time controlled switch 60. As said switch is operated at predetermined and regular intervals, it moves through the resistance 61 to its dotted line position at which time the magnets 41 of the system are energized and said switch is then moved slowly back to its normal position.

When a direct current system is employed, as in Fig. 6, the electromagnets should each have in series therewith a condenser 62, and when the capacity of the condenser is properly proportioned to the inductance of the magnet coil, a low voltage alternating current in series with the direct current will, at the proper time intervals, energize the magnet to restore its pusher. The alternating current may be of a standard frequency and supplied by a step-down transformer the low voltage secondary 64 of which is in series with one of the line conductors 63. A short circuit 65 for the secondary is normally closed by the time controlled switch 66, but when the latter is thrown, at predetermined intervals, it connects the primary 67 of the transformer in the circuit to thereby impress upon the direct current line an alternating current supplied to the primary over the conductors 68 which are connected to a suitable source.

It is to be further noted that when an auxiliary conductor is used as in Fig. 3, in an alternating current system having transformers between the power plant and the service lines, the time controlled switch may be located either on the service side of the transformers or in the power plant, in which case a separate transformer is used. The secondary voltage of this transformer may be standard or a low voltage may be used to operate the magnets of the demand meters.

What is claimed is:

1. In a metering system, a three phase, four wire circuit including a grounded neutral conductor, a plurality of measuring instruments in said circuit and each including an indicator operable in accordance with values of a quantity being measured, means movable from a normal position to so operate said indicator, an impulse-responsive element at each measuring instrument operatively connected to said operating means, a control station, a low voltage direct current generator at said control station having its armature normally short circuited and permanently connected to said neutral conductor, a shunt field for said generator, and a switch normally short circuiting said armature and periodically operated to open said short and connect said shunt field to said armature whereby to transmit an impulse over said conductor to said responsive elements to restore said indicator operating means at each instrument to normal position.

2. In a metering system in which direct current impulses are superimposed upon a three phase, four wire circuit including a neutral ground conductor to operate an electro-responsive device permanently connected to said circuit and the neutral conductor thereof, the combination of a low voltage direct current generator having its armature permanently connected to said grounded conductor and further having a shunt field, means to normally short circuit said armature and, means to open said short circuit and connect said shunt field to said armature whereby to superimpose a direct current impulse upon said circuit and thereby energize said electro-responsive device.

EMANUEL N. GOODMAN.